(12) United States Patent
Bonte et al.

(10) Patent No.: US 10,578,165 B2
(45) Date of Patent: Mar. 3, 2020

(54) COUPLING

(71) Applicant: CNH Industrial America LLC, New Holland, PA (US)

(72) Inventors: Xavier Bonte, Zuidzande (NL); Ruben Gryson, Beselare (BE)

(73) Assignee: CNH Industrial America LLC, New Holland, PA (US)

( * ) Notice: Subject to any disclaimer, the term of this patent is extended or adjusted under 35 U.S.C. 154(b) by 292 days.

(21) Appl. No.: 15/439,498

(22) Filed: Feb. 22, 2017

(65) Prior Publication Data

US 2017/0241484 A1 Aug. 24, 2017

(30) Foreign Application Priority Data

Feb. 22, 2016 (BE) .................................. 2016/5121

(51) Int. Cl.
*F16D 3/78* (2006.01)
*A01B 61/02* (2006.01)
(Continued)

(52) U.S. Cl.
CPC .............. *F16D 3/78* (2013.01); *A01B 61/025* (2013.01); *A01D 89/005* (2013.01); *B60K 25/02* (2013.01);
(Continued)

(58) Field of Classification Search
CPC ... F16D 3/78; F16D 3/60; F16D 7/025; F16D 41/00; A01B 61/025; A01D 89/005; B60K 25/02; B60K 2025/022; F16H 7/02
(Continued)

(56) References Cited

U.S. PATENT DOCUMENTS 210,268 A * 11/1878 Replogle ........................ 464/81
1,355,516 A * 10/1920 Stahl .......................... F16D 3/78
180/383

(Continued)

FOREIGN PATENT DOCUMENTS

DE 102010053691 A1 6/2012
GB 689883 A 4/1953
(Continued)

OTHER PUBLICATIONS

Universal Joint and Driveshaft Design Manual, AE-7, Society of Automotive Engineers, Inc., Warrendale, PA, pp. 209-211, TJ1079. S62 (Year: 1979).*

*Primary Examiner* — Greg Binda
(74) *Attorney, Agent, or Firm* — Peter K. Zacharias; Patrick M. Sheldrake (57) ABSTRACT

An industrial work vehicle including a frame and a first shaft rotatably connected to the frame via first and second bearings. The work vehicle further includes a second shaft rotatably positioned in line with the first shaft and connected to the first shaft via a coupling. The second shaft is further connected to the frame via a third bearing. The coupling includes a first connection and a second connection. The first connection connects the first shaft to the second shaft via a fourth bearing adapted to support a radial load and to accommodate an axial rotation and an angular misalignment of one shaft with respect to the other shaft. The second connection connects the first shaft to the second shaft via flange elements which are interconnected via an intermediary element adapted to transmit a torque and to accommodate a misalignment of one shaft with respect to the other shaft.

11 Claims, 5 Drawing Sheets

(51) Int. Cl.
  *F16D 3/60* (2006.01)
  *A01D 89/00* (2006.01)
  *B60K 25/02* (2006.01)
  *F16D 7/02* (2006.01)
  *F16D 41/00* (2006.01)
  *F16H 7/02* (2006.01)

(52) U.S. Cl.
  CPC .............. *F16D 3/60* (2013.01); *F16D 7/025* (2013.01); *B60K 2025/022* (2013.01); *F16D 41/00* (2013.01); *F16H 7/02* (2013.01)

(58) Field of Classification Search
  USPC ....... 464/45, 69, 81, 100; 180/383; 192/55.2
  See application file for complete search history.

(56) References Cited

U.S. PATENT DOCUMENTS

| | | |
|---|---|---|
| 3,972,205 A | 8/1976 | Schmidt |
| 4,588,388 A | 5/1986 | Chivari |
| 5,176,575 A | 1/1993 | McCullough |
| 2004/0104090 A1 | 6/2004 | Jansen et al. |
| 2008/0009354 A1 | 1/2008 | Hodjat et al. |
| 2014/0228133 A1 | 8/2014 | Daniel et al. |

FOREIGN PATENT DOCUMENTS

| | | | | |
|---|---|---|---|---|
| GB | 2191562 A | 12/1987 | | |
| IT | 243461 | * 2/1926 | ..................... | 464/69 |
| WO | 2014187882 A2 | 11/2014 | | |
| WO | 2015032376 A1 | 3/2015 | | |

* cited by examiner

COUPLING

CROSS REFERENCE TO RELATED APPLICATION

This application claims priority to Belgium Application No. 2016/5121 filed Feb. 22, 2016, the contents of which are incorporated herein by reference.

FIELD OF THE INVENTION

The present invention relates to an industrial work vehicle comprising a frame and a first shaft rotatably connected to the frame via a first and a second bearing support, the work vehicle further comprising a second shaft rotatably positioned in line with the first shaft and connected to the first shaft via a coupling, and the second shaft being further connected to the frame via a third bearing support.

BACKGROUND OF THE INVENTION

Such combination of shafts is often used in industrial work vehicles to synchronize two movements. A first movement is directly related to the first shaft and a second movement is directly related to the second shaft. Thereby, one of the two shafts is typically driven, and the other of the two shafts is connected to one of the shafts so that rotation of one shaft can be transmitted to the other shaft. By providing a coupling between these shafts, overload protection mechanisms as well as free-wheel mechanisms can be implemented between the shafts to ensure correct operation and to protect the working elements of the vehicle.

A drawback of such set-up is that any static or dynamic misalignment between the first shaft and the second shaft induces a significant wear to the coupling and to the shafts. Particularly, when high torques are transmitted from the first shaft to the second shaft or vice versa, as is conventional in industrial work vehicles, the wear can significantly limit the lifetime of the coupling. Even when the coupling is chosen to be able to cope with such misalignments, still these misalignments typically induces torque forces to the shaft in radial directions. Spline connections, which are typically used to connect the shafts to the coupling, cannot resist such radial torques and tend to wear off. When the teeth of the spline connection are worn off, the complete shaft must be replaced, which is cumbersome, time consuming and expensive.

It is an object of the present invention to provide a solution to one or multiple of the above mentioned drawbacks.

SUMMARY OF THE INVENTION

To this end, the invention provides an industrial work vehicle comprising a frame and a first shaft rotatably connected to the frame via a first and a second bearing support, the work vehicle further comprising a second shaft rotatably positioned in line with the first shaft and connected to the first shaft via a coupling and a second shaft being further connected to the frame via a third bearing support, the coupling comprising a first connection and a second connection, the first connection connecting the first shaft to the second shaft via a fourth bearing adapted to support a radial load and to accommodate an axial rotation and an angular misalignment of one shaft with respect to the other shaft, the other connection connecting the first shaft to the second shaft via flange elements which are interconnected via an intermediary element adapted to transmit a torque and to accommodate a misalignment of one shaft with respect to the other shaft.

In the claimed invention, the coupling comprises a first connection and a second connection. This is based on the insight that a coupling that accommodates a misalignment is conventionally very poor in supporting a radial load. Furthermore, couplings to transmit a high torques are conventionally very poor in accommodating a misalignment. When such coupling is adapted to accommodate a misalignment and is able to support a radial load, the misalignment induces a radial torque to the shafts thereby wearing off the teeth of the supplying connection. Thereby radial torque is defined as a torque exerted around an axis which shows an angle with respect to the rotation axis of the shaft. The coupling of the invention solves this problem by providing a dual connection. The first connection is formed by the fourth bearing which is adapted to support the radial load, so that the second connection is free from radial loads. This allows the second connection to be adapted to transmit a torque and to accommodate a misalignment without inducing a radial torque to the shafts. Because misalignment is accommodated by both the first and the second connection, without inducing a significant radial torque to the shafts, the coupling can operate and support a radial load and transmit high torques without damaging the shafts.

Preferably, the fourth bearing is a spherical bearing. Spherical bearings are known to support radial loads and to accommodate axial rotation and an angular misalignment of one shaft with respect to the other shaft. While accommodating the axial rotation and angular misalignment, the spherical bearing is known not to induce radial loads as a reaction. Therefore, a spherical bearing is optimized for forming the first connection.

Preferably, at least one of the flange elements is connected via a free-wheel mechanism to one of the first shaft and second shaft. The free-wheel mechanism allows one of the shafts to continue to rotate after the other one of the shafts has stopped. This improves working operations when the vehicle is driven backwards and one of the shafts at least partially touches the ground, while the other one of the shafts does not bear a corresponding load.

Preferably, the flange elements comprise at least a first flange element connected to the first shaft and a second flange element connected to the second shaft, the first flange element and the second flange element each comprising a radially extending surface and the flanges being positioned such that the surfaces face each other. When flange elements are provided with radially extending surfaces that face each other, an intermediary element can be easily mounted and designed to interconnect the flanges to be able to transmit a torque and to accommodate a spherical bearing of one shaft with respect to the other.

Preferably, the intermediary element comprises at least one spring plate. Spring plates are known to allow an elastic deformation by bending of the plates without significant resistance, at least when deforming within certain boundaries. Multiple spring plates can be positioned adjacent to each other or on top of each other to interconnect the flange elements.

Preferably, the at least one spring plate is connected to the first flange element at multiple locations along a circle, having the first shaft as a center, and is connected to the second flange element at multiple corresponding locations along a corresponding circle, having the second shaft as a center, the locations showing an angular displacement from the corresponding locations. As a result of the angular displacement, the locations are not in line with the corresponding locations. Because the locations are not in line with the corresponding locations, distances between locations and corresponding locations are bridged by the spring plate in directions substantially perpendicular to the radially extending surfaces of the flanges. This allows the spring plates to bend between locations and corresponding locations thereby allowing a misalignment without inducing a significant radial torque to the shafts.

Preferably, the at least one spring plate comprises a spring plate for each of the multiple locations to bridge a distance resulting from the angular displacement between each location and each corresponding location, wherein each spring plate extends straight between a location and a corresponding location. Because the spring plates extend straight between the location and the corresponding location, the plate is optimized for transmitting a force resulting from a movement from the one location with respect to the other location. Providing multiple spring plates for connecting each of the multiple locations to each of the corresponding locations is only possible because the radial load is carried by the fourth bearing. In prior art situations where no dual connection is provided, the spring plate must have an extra function, being to keep the locations in a predetermined relative position with respect to the corresponding locations. Therefore, it was not possible to provide separate spring plates for mounting between the locations and corresponding locations, since in such situation the separate spring plates cannot bear a radial load. In the current set-up, it is possible because the radial load is supported by the fourth bearing so that the center of the first shaft is kept in line with the center of the second shaft and the spring plates only serve to keep a predetermined angular position of the first flange element with respect to the second flange element.

Preferably, the circle and the corresponding circle have a radius that is smaller than the distance. The spring plates bridge the distance, and the larger the distance, the more efficient the misalignment can be accommodated because the length of the spring plates, over which length they can bend in reaction to a misalignment, increases. Therefor, by dimensioning the distance larger than the radius and the circle at which the location and corresponding locations are provided, misalignment can be maximally allowed with minimal radial torque to the shafts while axial torque can be optimally transmitted.

Preferably, the free-wheel mechanism and spring plates are oriented relative to each other such that the axial torque is transmittable in a single rotational direction by applying a tensile load to the spring plates. The free-wheel mechanism has as a direct consequence that a torque can only be transmitted through the coupling in a single rotational direction. Then the spring plates are applied between the locations and corresponding locations in such a manner that when torque is transmitted in the single rotational direction, a tensile load is applied to the spring plates. Spring plates are typically optimized to transmit a force by applying a tension.

The spring plates are positioned substantially symmetrically, preferably line- or plane-symmetrical, so that torque is transmitted by the spring plates in a balanced manner. Thereby creation of adverse side effects, such as radial loads, are avoided.

Preferably, at least one of the flange elements comprises an overload protection mechanism. Via the overload protection mechanism, the coupling and the shafts as well as the mechanisms that are driven by the shafts are protected against overload.

Preferably, the industrial work vehicle is an agricultural vehicle. Further, preferably, the frame is a pick-up frame, the first shaft is a pick-up drive shaft and the second shaft is a packer drive shaft. The invention is arisen to solve significant wear problems to pick drive shafts and packer drive shafts. The pick drive shaft is connected to the packer drive shaft as is described above via a coupling. Any misalignment of the one shaft with respect to the other shaft, in a prior art setup, induces a significant wear to the splines provided at the shafts so that the shafts have a shortened lifetime. This problem was solved by implementing a shaft as is described above.

BRIEF DESCRIPTION OF THE DRAWINGS

Some embodiments of apparatus and/or methods in accordance with embodiments of the present invention are now described, by way of example only, and with reference to the accompanying drawings, in which.

DETAILED DESCRIPTION OF THE INVENTION

Industrial work vehicles such as agricultural vehicles and landscaping vehicles typically comprise vehicle specific mechanical processing elements. Very often, such processing elements are driven via gearboxes and mechanical transmission systems, wherein a limited number of power sources such as motors and/or engines drive multiple processing elements. These processing elements are interconnected via shafts, couplings and gears to synchronize the processing elements and to allow the processing elements to be driven by the limited number of power sources.

Figure 1:
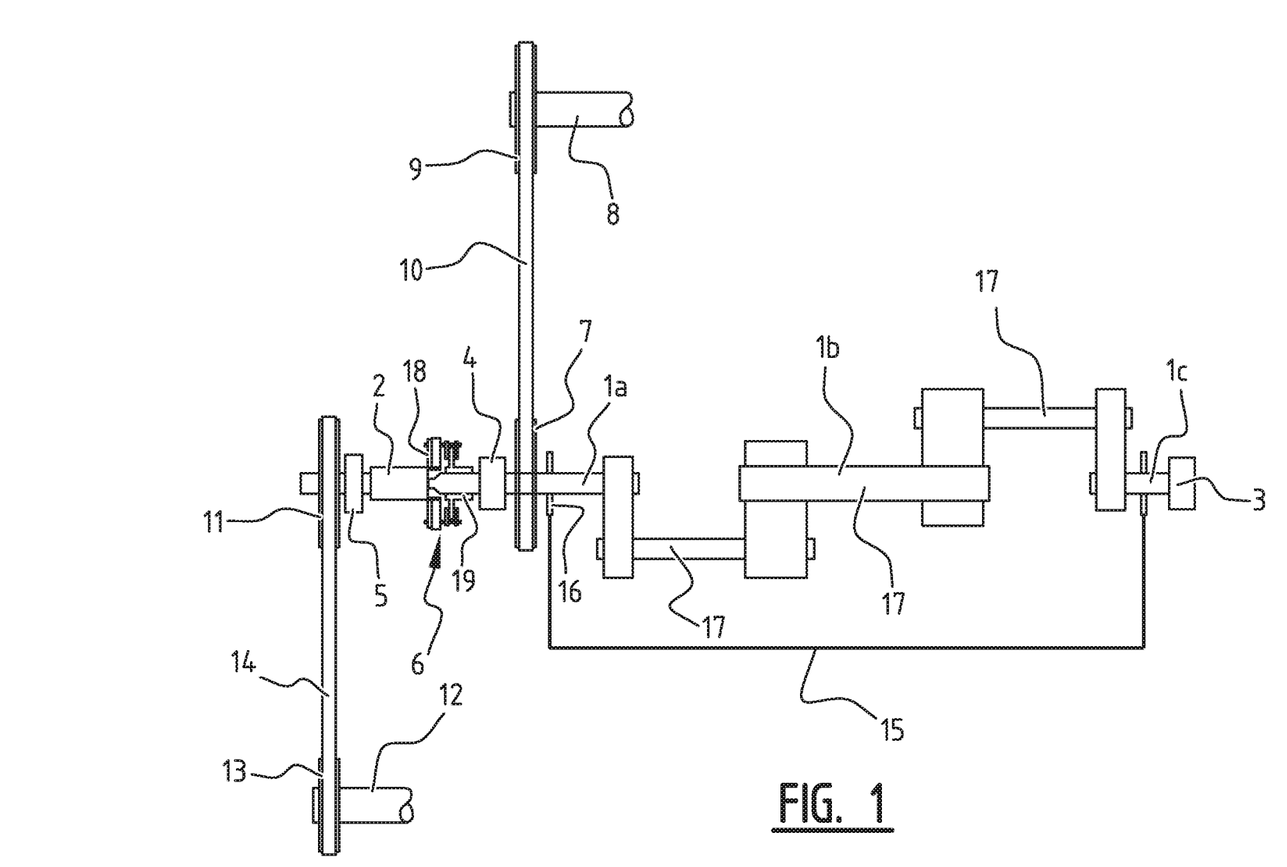
FIG. 1 illustrates a setup of a first shaft and a second shaft according to an embodiment of the invention.

FIG. 1 schematically shows a pick-up system for an agricultural vehicle. Such pick-up system comprises multiple processing elements which are each connected to their respective shaft. FIG. 1 shows a packer drive shaft 1, having multiple segments 1a, 1b and 1c together forming the drive shaft 1, and a pick-up drive shaft 2. The packer drive shaft 1 comprises multiple packer elements 17 or packer teeth. The packer elements 17 are operated by inducing a movement via rotation of the packer drive shaft 1. The packer drive shaft is rotatably connected to a frame (not shown) via a first support bearing 3 and a second support bearing 4. These support bearings 3 and 4 determine the position of the packer drive shaft with respect to the frame. The pick-up drive shaft 2 is connected to the frame via a third support bearing 5. The pick-up drive shaft 2 is arranged in line with the packer drive shaft 1 and is connected to the packer drive shaft 1 via a coupling 6. Because the coupling 6 is connected to the packer drive shaft 1, which has a fixed position with respect to the frame, the pick-up drive shaft 2 is also located in a fixed position with respect to the frame via the third support bearing 5 and the coupling 6.

The frame (not shown) can be integrally formed with a frame of the agricultural vehicle, so that the bearings 3, 4 and 5 directly couple the first and second shaft 1 and 2 to the agricultural vehicle. Alternatively, the frame can be suspended from the agricultural vehicle thereby forming a sub-frame, for example in the shown embodiment where the bearings 3, 4 and 5 are connected to a pick-up frame. In this embodiment, the pick-up frame is connected to the agricultural vehicle via further bearings 16, wherein the agricultural vehicle frame is schematically illustrated with line 15.

In the set-up of FIG. 1, the packer drive shaft 1 is driven via a gear 7 connected to the packer drive shaft 1. The gear 7 is connected to a power source 8 via a further gear 9 at the power source 8, and wherein the gear 7 and the further gear 9 are interconnected via a chain or belt 10. The power source 8 can be formed by a gear box which is connected to the engine of the agricultural vehicle. Alternatively, the power source 8 is connected to a hydraulic motor.

The pick-up drive shaft 2 is connected to a pick-up drive element 12 via a gear 11 and a further gear 13 bridged by a chain or belt 14. Via such set-up, the pick-up drive shaft 2 is able to operate pick-up drive elements. Due to the mechanical coupling between the packer drive shaft 1 and the pick-up drive shaft 2, the packer elements 17 and the pick-up drive elements 12 automatically move in a predetermined synchronized manner. Thereby, the synchronization is ensured via the mechanical connection or the mechanical transmission.

The coupling 6, interconnecting the packer drive shaft 1 and the pick-up drive shaft 2, is provided so that a torque can be transmitted from the packer drive shaft 1 to the pick-up drive shaft 2. Furthermore, the coupling 6 preferably comprises an overload mechanism. Optionally, the coupling 6 comprises a free-wheel mechanism so that a torque can only be transmitted in one rotational direction. Such overload protection mechanism and optionally free-wheel mechanism ensure correct operation of the packer elements and pick-up drive elements in extreme working conditions. A coupling 6 is connected to the packer drive shaft 1 for example via a spline connection 19 and is connected to the pick-up drive shaft for example via a flange 18. A prior art coupling 6' is illustrated in FIG. 2.

Although FIG. 1 shows the specific situation of an agricultural pick-up, it will be clear that similar set-ups can be used in other types of industrial working vehicles and for other processing purposes. For this reason, the skilled person will recognize that the description of FIG. 1 is applicable to any situation where a first shaft 1 is arranged in line with a second shaft 2, wherein the first shaft is rotatably connected to the frame via a first and a second bearing support and wherein the second shaft is connected to the frame via a third bearing support and is coupled to the first shaft 1 via a coupling 6. Therefore, the description of FIG. 1 will provide support for a broader application of the set-up and coupling than only to connect a pick-up drive shaft 2 to a packer drive shaft 1.

Figure 2:
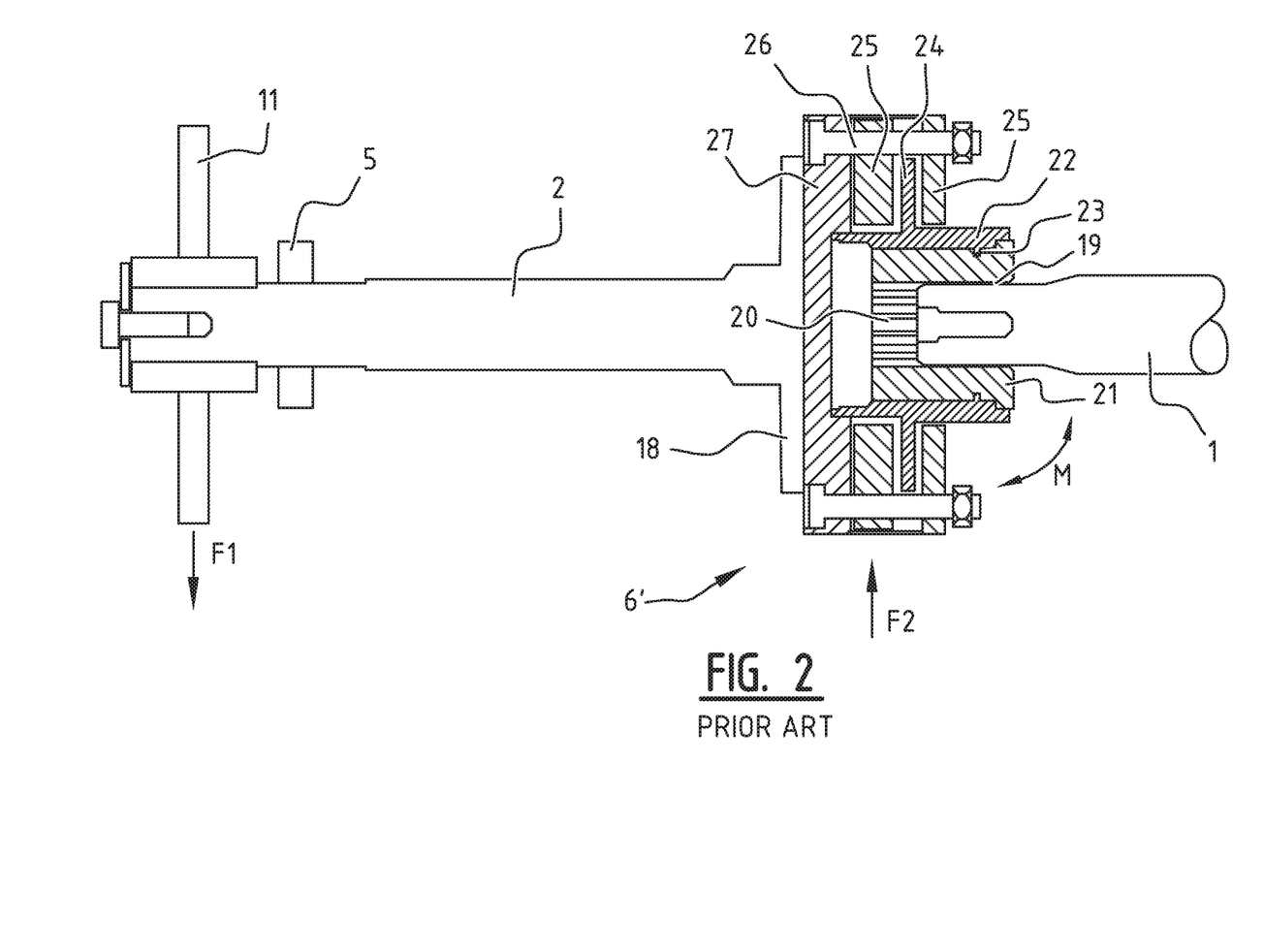
FIG. 2 illustrates a coupling according to the prior art.

FIG. 2 shows the first shaft 1 and the second shaft 2, interconnected via a coupling 6' as is known in the prior art. This coupling 6' comprises a spline connector 21 for mounting the coupling 6' to the first shaft 1 via a spline connection 19. Reference number 20 illustrates the teeth of the spline connection 19. These teeth are provided at the inside of the spline connector 21 and at the outside of the first shaft 1 in a complementary manner.

The spline connector 21 is further connected to an intermediary coupling connector 22. Preferably, a free-wheel mechanism 23 is provided between the spline connector 21 and the intermediary coupling connector 22 so that the spline connector can freely rotate within the intermediary coupling connector in one single rotational direction. Such free-wheel mechanisms are known in the prior art and are therefore not described in more detail.

The intermediary coupling connector 22 comprises an overload disc 24 which is squeezed between multiple overload housing elements 25 so that a predetermined friction is present between the overload disc 24 and the overload housing elements 25. Due to this predetermined friction, the coupling 6' is protected against overload. The predetermined friction corresponds to a maximum torque force that can be transmitted through the coupling 6'. When the maximum torque is exceeded, the overload disc 24 will rotate between and with respect to overload housing elements 25 so that the direct mechanical transmission is interrupted.

The friction between the overload disc 24 and the overload housing elements 25, which friction determines the height of the maximum torque that can be transmitted through the coupling 6' is adjustable via tensioning bolts 26. These tensioning bolts further connect the overload housing elements 25 with the coupling body 27. The coupling body 27 forms, at least when the coupling 6' is mounted to the first shaft 1 as described above, a flange element at the first shaft 1. This flange element is in this description also referred to as a first flange element. In the prior art coupling 6', the coupling body 27 is directly connected to the flange 18 of the second shaft 2.

The use of such prior art coupling 6' as is shown in FIG. 2 in a set-up as is shown in FIG. 1, is suboptimal in a real life situation. In theory, the first shaft 1 and the second shaft 2 can be oriented perfectly in line with each other. However, in a real life situation, such perfect alignment cannot be realized. In a real life situation, there is typically a static and a dynamic misalignment, having different possible causes, and the static and/or dynamic misalignment might change overtime. Misalignment can be the result of for example imperfect positioning of the first bearing 3, second support bearing 4 and/or third support bearing 5, from the first shaft 1 and/or the second shaft 2 not being perfectly straight, from the first shaft 1 and/or the second shaft 2 not being perfectly rigid and many others.

A further effect that arises when a set-up such as illustrated in FIG. 1 is used will be explained with reference to FIG. 2. The second shaft 2 is connected to corresponding operation elements via gear 11. Connection of the gear 11 to the corresponding elements induces a force F1 to the shaft 2. The second shaft 2 will behave as a leverage with a pivot point at the third support bearing 5, so that a force F2 is transmitted to the coupling 6' forming a radial load to the coupling 6'. This force F2 must be supported by the coupling 6' during operation. The coupling 6' must therefore not only be able to transmit a torque force from the first shaft 1 to the second shaft 2, but must also be able to bear the radial load or force F2.

A misalignment will further result in movements of the first shaft 1 with respect to the second shaft 2 in a rotational direction which are illustrated in FIG. 2 with arrow M. This rotational direction is at least partially perpendicular to the rotation axis of the shaft 1. The coupling 6' as is shown in FIG. 2 is adapted for supporting the force F2. However, this coupling 6' is not adapted to accommodate a misalignment, particularly not the movement M resulting from the misalignment. Therefore, any movement of the coupling as a result of misalignment will induce a radial torque in the same direction as the movement M. Radial torque is defined as a torque which is at least partially, preferably at least more than 50 percent around an axis that is perpendicular to the rotational axis of the first shaft 1. Axial torque is defined as a torque around the rotation axis of the first shaft 1. The radial torques M will significantly increase the wear of the coupling 6' and the coupling connection with the first shaft 1 and the second shaft 2. Thereby, tests have shown that the spline connection will show the highest impact of the wear. Over time, the teeth 20 will wear off from the first shaft 1, so that the complete shaft 1 must be replaced.

Figure 3:
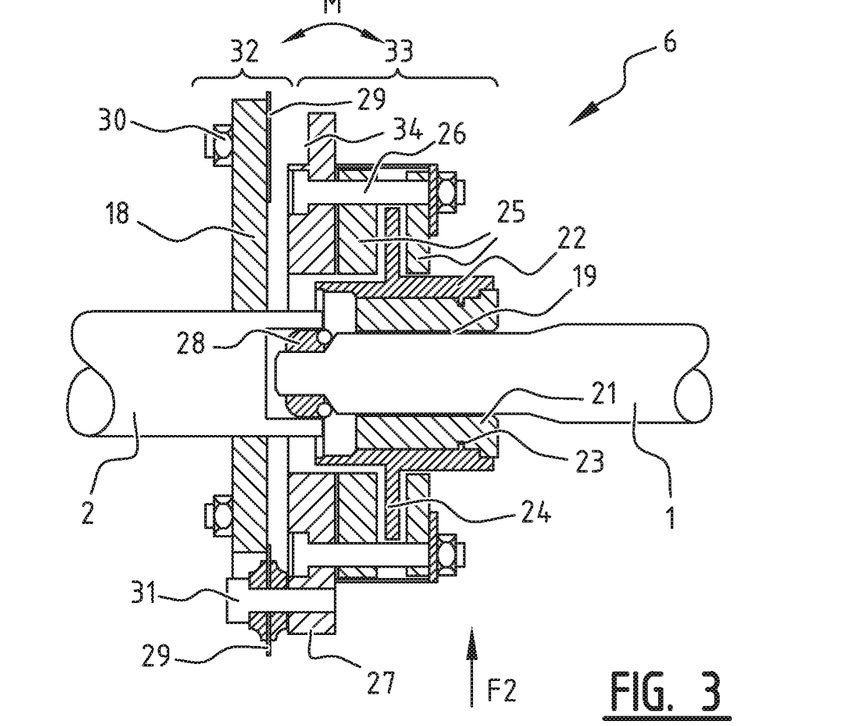
FIG. 3 illustrates a coupling according to a first embodiment of the invention.

FIG. 3 shows a first preferred embodiment of the coupling 6 of the invention. The coupling 6 interconnects the first shaft 1 and the second shaft 2. In the embodiment of FIG. 3, the coupling 6 comprises a first connection 28 embodied in the central part of the coupling 6 and a second connection 29 embodied in the periphery of the coupling 6. The first connection is formed by a fourth bearing 28, which is preferably a spherical bearing. The bearing 28 is chosen such that an axial rotation of the first shaft 1 with respect to the second shaft 2 is embodied and that a limited radial rotation resulting from a misalignment between the first shaft 1 and the second shaft 2 is also accommodated by the bearing 28. Furthermore, the bearing 28 is chosen to be able to support a radial load. Thereby, the bearing 28 supports the force F2 that is induced on the coupling 6 in operation. Because the force F2 is supported by the fourth bearing 28, the remaining parts of the coupling 6 are relieved from such radial load. This allows the second part of the connection, which is embodied in the periphery of the coupling 6, to be adapted to transmit an axial torque while accommodating a misalignment and while accommodating a radial load, since this radial load is supported by the first connection.

In the embodiment of FIG. 3, the coupling 6 comprises a spline connector 21 which is connected to the first shaft 1 via a spline connection 19. The coupling also comprises an intermediary coupling connector 22 which is connected to the spline connector via a free-wheel mechanism 23. The intermediary coupling connector comprises an overload disc 24 which is squeezed between multiple overload housing elements 25 to embody an overload protection in the coupling. The overload housing elements are connected to each other and to the coupling body 27 via tensioning bolts 26. Unlike the coupling of FIG. 2, the coupling body 27 is not directly coupled to the flange of the second shaft 2, but is indirectly connected to this flange 18 via spring plates 29.

Figure 4:
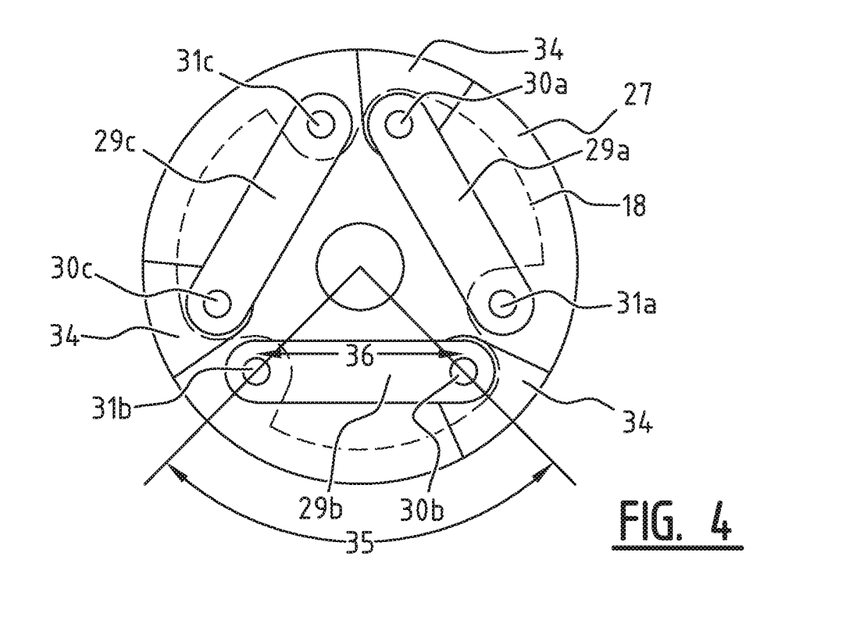
FIG. 4 illustrates the spring plates of the embodiment of FIG. 3.

The spring plates extend substantially perpendicular to the rotation axis of the first shaft 1. These spring plates 29 are mounted between the coupling body 27 which forms a first flange element 27 comprised by the first shaft 1 and the flange 18 which forms a second flange element 18 comprised by the second shaft 2. The first flange element 27 and the second flange element 18 comprise a substantially identical pattern of locations for connecting the spring plates 29. Thereby, each one of the locations at the first flange element 27 has a corresponding location at the second flange element 18. In FIGS. 3 and 4, the locations and connection to the spring plates 29 at the first flange element 27 are indicated with reference number 31 and the corresponding locations and corresponding connections to the spring plates at the second flange element 18 are indicated with reference number 30.

FIG. 4 shows a cross-section and illustrates how the spring plates 29, three spring plates 29*a*, 29*b* and 29*c* are shown in FIG. 4, interconnect the first flange element 27 and the second flange element 18. Thereby, FIG. 4 illustrates the angular displacement 35 around the rotation axis of the first shaft 1 of the pattern of locations 31 with respect to the pattern of corresponding locations 30. This angular displacement 35 results in a distance 36 between each one of the locations 31 and corresponding locations 30. Thereby, the spring plates 29 are mounted to bridge the distance 36. The spring plates are manufactured from a material that allows, within predetermined boundaries, bending of the plate 29 by elastic deformation. This property of the spring plates 29, in combination with distance 36 allows the axial distance between each one of the locations 31 and corresponding locations 30 to vary within predetermined boundaries. Namely, this variation can be accommodated by the spring plates 29 via elastic deformation of the plates. When the axial distance between a location and a corresponding location is minimal, the plate 29 can extend substantially flat between these locations. When the axial distance increases, the spring plate will bend to form a sigmoid shape, thereby bridging the axial distance between the location 31 and corresponding location 30. Such sigmoid shape has a negligible influence on the distance 36 that is bridged in the radial direction by the plates 29.

It will be clear from FIG. 4 that these plates 29 are unable to support a radial load. However, in the coupling 6 the radial load is supported by the fourth bearing 28. To facilitate the connection of the spring plates 29 to the first and second flange elements 27, 18, the flange elements can be shaped to provide space for connection elements, as is illustrated in FIG. 4 by the shape of the second flange element 18. Alternatively, indentations 34 can be provided to the flange elements as is illustrated with reference 34 in FIGS. 3 and 4.

The assembled coupling of the first embodiment, as is shown in FIG. 3 comprises a first part 33 at an end of the first shaft 1, and comprises a second part 32 at an end of the second shaft 2. An axial torque can be transmitted from the first part 33 to the second part 32 via the spring plates 29. A radial load F2 can be supported by the fourth bearing 28. Movements M resulting from a misalignment between the first shaft 1 and the second shaft 2 are accommodated by both the fourth bearing 28 which is preferably spherical, and by the spring plates 29 as is described above. The effect is that movements resulting from a misalignment are allowed in the coupling 6 with a minimal resistance so that no significant radial torque forces arise. This significantly decreases the wear on the spline connection 19.

Figure 5:
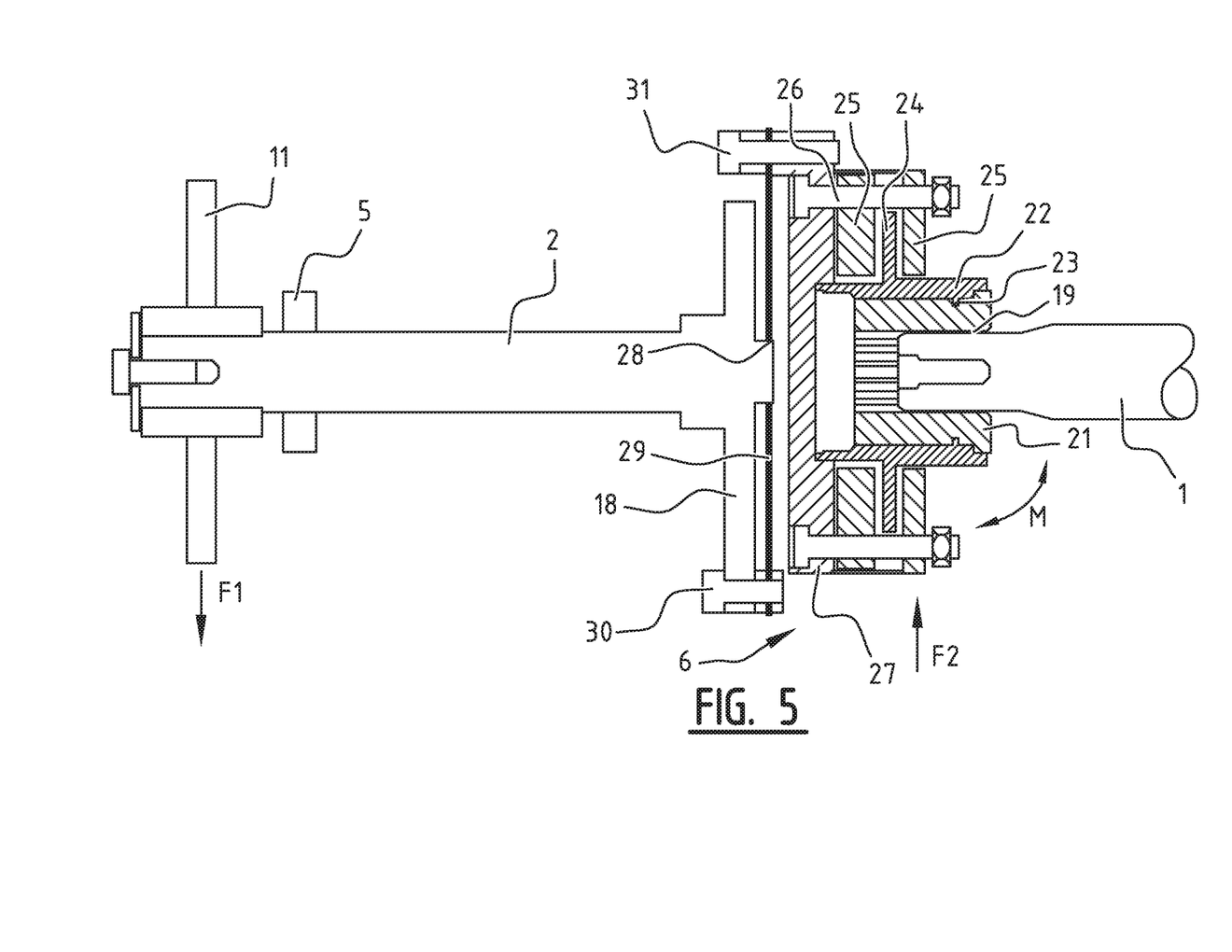
FIG. 5 illustrates a coupling according to a second embodiment of the invention.
Figure 6:
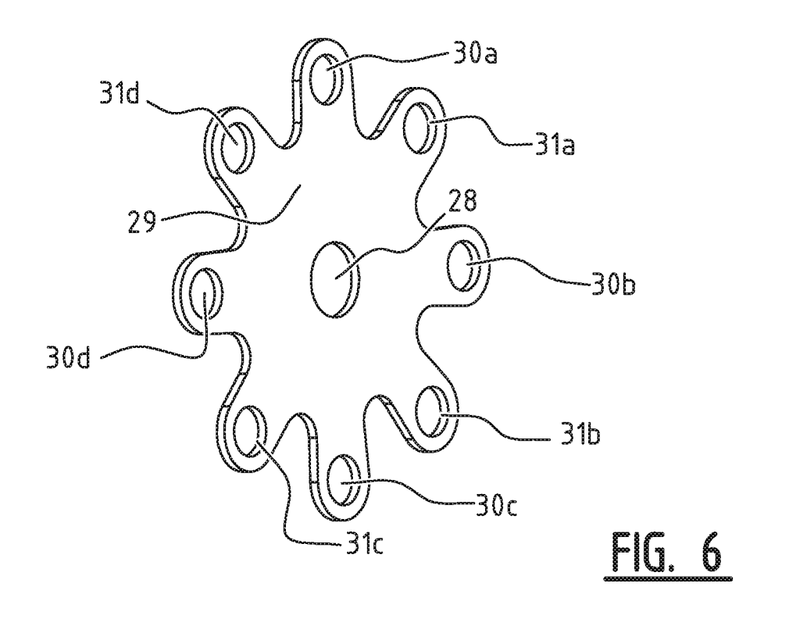
FIG. 6 illustrates the spring plate of the embodiment of FIG. 5.

FIGS. 5 and 6 show a second embodiment of the invention, wherein the segment of the coupling between the first flange element 27 and the first shaft 1 is substantially identical to the embodiment of FIG. 3. Therefore a description of this part is omitted and reference is made to the description above.

In the embodiment of FIG. 5 a spring plate 29 is provided that comprises the first connection 28 in a central part of the coupling 6 and the second connection at the periphery of the coupling 6. Particularly, the spring plate 29 comprises a central opening wherein the second shaft 2 is inserted. By this insertion of the second shaft 2 in the central opening of the spring plate 29, radial loads F2 can be supported. Furthermore, the spring plate 29 is provided at its periphery with multiple protrusions. There protrusions are best illustrated in FIG. 6. Each of the protrusions corresponds to a location or corresponding location at the first or second flange element. In the embodiment of FIG. 5, bending of a protrusion of one or the other side of the plane of the spring plate is possible via elastic deformation of the plate, at least within predetermined boundaries. This allows axial distances to be bridged between a location 30 and a corresponding location 31 without a significant resistance. As an effect, misalignment of the first shaft 1 and the second shaft 2 can be accommodated by the peripheral connection of the coupling 6.

The first embodiment of FIG. 3 is superior over the second embodiment of FIG. 5 because axial torque can be transmitted through the spring plates 29 of FIG. 3 in a more optimal manner than through the spring plate 29 of FIG. 5. The spring plate of FIG. 3 extends straight and directly between each location and each corresponding location. In the spring plate of FIG. 5, the axial torque force is transmitted from one protrusion via a central part of the spring plate to a further protrusions, which is suboptimal. FIG. 5 illustrates at a bottom of the coupling 6 how the spring plate 29 is connected to the second flange via connection 30 and shows at an upper part of the coupling 6 how the spring plate 29 is connected to the first flange via connection 31.

Figure 7:
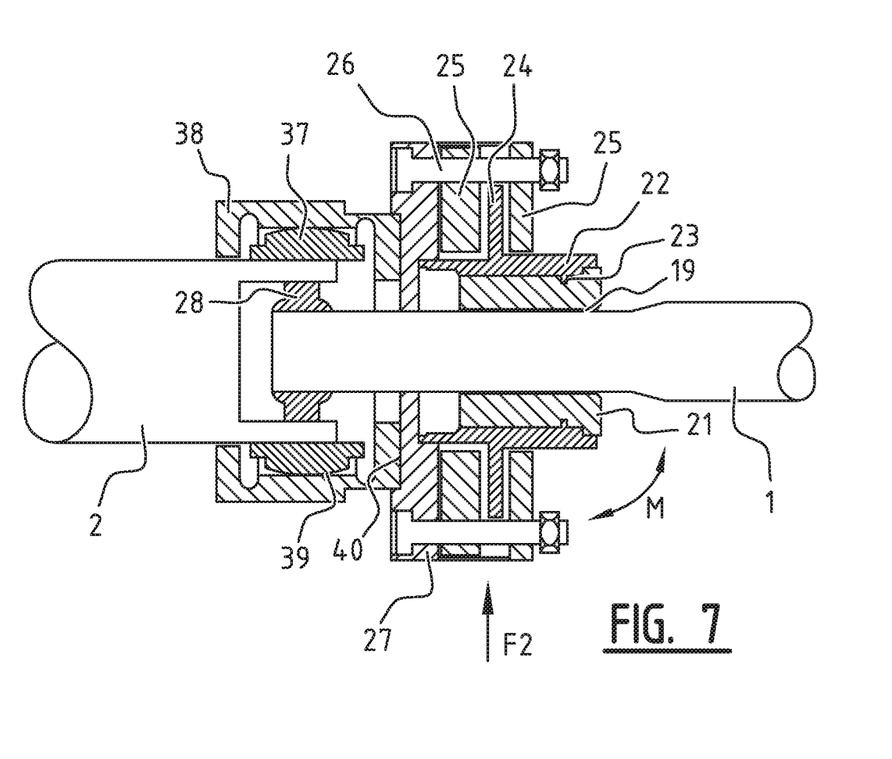
FIG. 7 illustrates a coupling according to a third embodiment of the invention.

FIG. 7 shows a third embodiment of the invention, wherein the coupling part between the first shaft 1 and the first flange element 27 is identical to the previous embodiments. The coupling comprises a first connection 28 formed by a fourth bearing located in the central part of the coupling, and comprises a second connection at the periphery of the coupling, which is in the embodiment of FIG. 7 formed by a spherical spline connection 39. The fourth bearing 28 is also formed as a spherical bearing 28, so that the fourth bearing can support a radial load and accommodate a misalignment of the first shaft 1 and the second shaft 2. An inner part of a spherical spline 37 is connected to the second shaft 2. This inner part 37 is connected to an outer part 38 of a spherical spline. This outer part 38 forms a flange 40 that is rigidly connected to the first flange 27. Tolerances of the fourth bearing 28 and the spline connection 39 are designed such that at least the majority of a radial load is supported by the fourth bearing 28. This relieves the spherical spline connection 39 from at least most of the radial load F2 so that the spline connection only transmits an axial torque.

Based on the figures and the description, the skilled person will be able to understand the operation and advantages of the invention as well as different embodiments thereof. It is however noted that the description and figures are merely intended for understanding the invention, and not for limiting the invention to certain embodiments or examples used therein. Therefore it is emphasized that the scope of the invention will only be defined in the claims. These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. An industrial work vehicle in the form of an agricultural work vehicle, comprising:
    a frame;
    a first bearing;
    a second bearing;
    a third bearing;
    a coupling comprising a first connection, a second connection, and a spline connector;
    a first shaft rotatably connected to the frame via the first and second bearings, and the spline connector of the coupling is connected to the first shaft via a spline connection;
    a second shaft rotatably positioned in line with the first shaft and connected to the first shaft via the coupling, the second shaft being further connected to the third bearing;
    a fourth bearing adapted to support a radial load and to accommodate an axial rotation and an angular misalignment of the first shaft with respect to the second shaft, and the fourth bearing is a spherical bearing; and
    one or more flange elements interconnected via an intermediary element adapted to transmit a torque and to accommodate a misalignment of the first shaft with respect to the second shaft,
    wherein the first connection of the coupling connects the first shaft to the second shaft via the fourth bearing, and
    wherein the second connection of the coupling connects the first shaft to the second shaft via the one or more flange elements, wherein movements resulting from the misalignment of the first shaft and the second shaft are accommodatable by both the fourth bearing and the intermediary element such that a wear on the spline connection is decreased.

2. The industrial work vehicle according to claim 1, wherein at least one of the one or more flange elements is connected via a free-wheel mechanism to one of the first shaft and the second shaft.

3. The industrial work vehicle according to claim 1, wherein the one or more flange elements comprise at least a first flange element connected to the first shaft and a second flange element connected to the second shaft, the first flange element and second flange element each comprising a radially extending surface, and the first and second flange elements being positioned such that their radially extending surfaces face each other.

4. The industrial work vehicle according to claim 3, wherein the intermediary element comprises at least one spring plate.

5. The industrial work vehicle according to claim 4, wherein the at least one spring plate is connected to the first flange element at multiple locations, which are centered about the first shaft, and is connected to the second flange element at multiple corresponding locations, which are centered about the second shaft, the multiple locations showing an angular displacement from the multiple corresponding locations.

6. The industrial work vehicle according to claim 5, wherein the at least one spring plate comprises a spring plate for each of the multiple locations to bridge a distance resulting from the angular displacement between the multiple locations and the multiple corresponding locations, wherein each spring plate extends straight between a location and a corresponding location.

7. The industrial work vehicle according to claim 6, wherein a first distance from a center of the first shaft to a respective location of the multiple locations is smaller than a length of each respective spring plate.

8. The industrial work vehicle according to claim 6, wherein the spring plates are positioned substantially symmetrically so that torque is transmitted by the spring plates in a balanced manner.

9. The industrial work vehicle according to claim 6, wherein at least one of the one or more flange elements comprises an overload protection mechanism.

10. The industrial work vehicle according to claim 1, wherein at least one of the one or more flange elements is connected via a free-wheel mechanism to one of the first shaft and the second shaft, and wherein the free-wheel mechanism and the at least one spring plate are positioned relative to each other such that a torque is transmittable in a single rotational direction by applying a tensile load to the at least one spring plate.

11. The industrial work vehicle according to claim 1, wherein the first shaft is a pick-up drive shaft and the second shaft is a packer drive shaft.

* * * * *